United States Patent [19]
Hickmann et al.

[11] Patent Number: 5,148,790
[45] Date of Patent: Sep. 22, 1992

[54] LOAD ADJUSTMENT DEVICE

[75] Inventors: Gerd Hickmann, Schwalbach/Ts; Manfred Pfalzgraf, Frankfurt am Main, both of Fed. Rep. of Germany

[73] Assignee: VDO Adolf Schindling AG, Frankfurt am Main, Fed. Rep. of Germany

[21] Appl. No.: 781,753

[22] Filed: Oct. 23, 1991

[30] Foreign Application Priority Data

Oct. 31, 1990 [DE] Fed. Rep. of Germany ....... 4034575

[51] Int. Cl.$^5$ ............................................. F02D 7/00
[52] U.S. Cl. .................................................. 123/399
[58] Field of Search ............... 123/399, 494, 339, 400, 123/361, 403; 180/197

[56] References Cited

U.S. PATENT DOCUMENTS

| 5,038,733 | 8/1991 | Westenberger | 123/339 |
| 5,060,613 | 10/1991 | Lieberotb-Lader et al. | 123/399 |
| 5,065,722 | 11/1991 | Hubar et al. | 123/399 |
| 5,072,708 | 12/1991 | Lieberoth-Lader et al. | 123/399 |
| 5,074,266 | 12/1991 | Kuhn et al. | 180/399 |
| 5,076,231 | 12/1991 | Büchl | 123/361 |
| 5,076,232 | 12/1991 | Pfahzgraf et al. | 123/399 |

*Primary Examiner*—Raymond A. Nelli
*Attorney, Agent, or Firm*—Martin A. Farber

[57] ABSTRACT

A load adjustment device has a throttle valve 9 which determines the output power of an internal combustion engine and is connected, fixed for rotation, with a throttle-valve shaft mounted in a throttle-valve housing. A control element 8a cooperates with a driver 4 coupled to an accelerator pedal 1, and acts on the throttle-valve shaft. A setting path of the driver 4 is limited by a stop ($LL_{max}$). Upon a resting of the driver 4 against the idle stop ($LL_{max}$), the control element 8a is moveable by means of the electric motor 14 in the idle control range relative to the driver 4. The control element 8a can be brought via a coupling member against a moveable stop 75 so that the setting lever 71, together with the throttle valve 9, is displaceable only via the electric motor 14 into a minimum idle position.

10 Claims, 3 Drawing Sheets

LOAD ADJUSTMENT DEVICE

FIELD AND BACKGROUND OF THE INVENTION

The invention relates to a load adjustment device having a throttle valve (9) which determines the output power of an internal combustion engine and is connected, fixed for rotation, with a throttle-valve shaft mounted in a throttle-valve housing. The throttle-valve shaft is acted on by a control element (8a) which cooperates with a driver (4) coupled to an accelerator pedal (1), and is controllable by means of an electric motor (14) cooperating with an electronic control device (17). A displacement path of the driver (4) is limited by an idle stop ($LL_{max}$) and, upon application of the driver (4) against the idle stop ($LL_{max}$), the control element (8a) is moveable within an idle control range relative to the driver (4) by means of the electric motor (14).

Load adjustment devices which cooperate with carburetors or injection pumps must satisfy the requirement of optimal control of the internal combustion engine over the entire load range. For this, a complicated construction or complicated control is necessary. Thus, carburetors, for instance, in addition to the actual means for forming the air-fuel mixture have additional means such as leaning, starting, idling, accelerating and economizing means, etc. These means complicate the construction of the carburetor and result in increased structural expense in that additional injection nozzles, pumps, special developments of the nozzle needles and separate air feeds are necessary, entirely aside from the high control requirements connected therewith.

Of particular importance in the case of load adjustment devices is control of the state of load of the idling at which only minimum output power is given off by the internal combustion engines while, however, particularly in the case of motor vehicles, there may be loads which require a large amount of power, such as fan, rear window heating, air conditioning, etc. In order to take these possible demands for power into consideration, control of the load adjustment device between a minimum idle position and a maximum idle position is necessary. In the event of failure of the control, an emergency idle position of the setting member or control member must be assured.

In contradistinction to the problem described, load adjustment devices of this type are used, as a general rule, in cases in which the accelerator pedal and the setting member are electronically connected to each other. The accelerator pedal is coupled to the driver and the latter is coupled to the control element. Furthermore, a desired-value detection element which cooperates with the control element and an actual-value detection element which cooperates with the desired-value detection element and acts on the electric setting drive are provided, the electric setting drive being controllable, as a function of the detected values, by the electronic control device.

The electrical connection of accelerator pedal and setting member with the interposed electronic control device makes it possible to set desired-value positions, determined by the accelerator pedal and the driver connected with it. This control is with reference to the actual values resulting from the position of the control element and setting element and serves to test them as to the presence or absence of plausibility conditions. Thereby, in case of the presence or absence of given plausibility conditions, there is the possibility, by means of the electronic control, of effecting a corrective action, by control of the electric setting drive, on the setting element. The setting element may be, for instance, a throttle valve or an injection pump. Thus, for instance, action by the electronic control device in order to avoid wheel slippage upon starting as a result of too much power being given by the gas pedal can be provided. Other automatic controls of the load adjustment device are conceivable, for instance, in the case of automatic shiftings of the transmission, a speed-governing control, or the abovementioned idle control of the internal combustion engine.

SUMMARY OF THE INVENTION

In contradistinction to this, it is an object of the invention to create a load adjustment device of the aforementioned type which, while being of simple structural development, assures reliable and precise control of the internal combustion engine over the entire idling range and a downward control upon response of the anti-slip control device. In this connection, the individual control elements, together with the corresponding stops, are to be so developed that the idle paths of the individual control elements are substantially disconnected, particularly when accelerating.

According to the invention, the control element can be brought against a moveable stop by a coupling member. As a result of the advantageous development of the load adjustment device, control is effected within the entire idle control range. For this, it is advantageous that the setting element associated with the throttle valve be disconnected from the driver so that, in the event of failure of the electrical control device, the throttle valve is automatically brought into the maximum idle position by the return spring. In addition, the throttle valve is brought into the desired position in the minimum idling direction by means of an electric control device.

As a further development of the invention, it is advantageous that a displaceable stop (75) be operatively connected to the driver (4).

Furthermore, it is advantageous that the adjustment path of the control element (8a) be limited in one direction by the moveable stop (75) and be displaceable in the other direction ($LL_{min}$) against the action of a spring (46). In this way, the throttle valve can be readily displaced below the maximum idle control range into the desired idling position by means of the electric motor. Furthermore, in the case of anti-slip control, the maximum setting value of the throttle valve is limited.

As a further development of the invention, it is advantageous that the control element (8a) be brought by the spring (46) against the moveable stop (75). In the device of the invention, it is of particular importance that a second control element (8b) be adapted to be connected with the throttle-valve shaft in the idle direction. In this way, assurance is had, in the event of anti-slip control, that the electric control device acts only to reduce the positioning of the passage of air in the carburetor, and displaces the throttle valve only in idling direction.

In accordance with a preferred embodiment of the invention, the spring (46), which is developed as coupling element, is connected at one end to the control element (8a) of the throttle valve (19) and at the other end to the driver (4). In this way, one obtains, in full-load direction, a firm connection, without play, between the control element and the driver so that no idle path need be moved over upon actuation of the gas pedal.

It is of particular importance in the device of the invention that the driver (4) can be brought to rest in idle direction ($LL_{min}$) against another displaceable stop (76) which can be displaced between an idle position $LL_{not}$ (emergency LL) and $L_{max}$. For this, it is advantageous that the second displaceable stop (76) rest at one end against pressing means and, at the other end, against a setting lever (71). Also, as viewed in the direction of action, opposite the second displaceable stop (76) which displaces the setting lever (71) in the maximum idling position, there is provided a third stop (77) which can be acted on by pressure means to displace the setting lever (71) in the emergency idling direction.

It is furthermore advantageous for the second displaceable stop (76) to be displaceable against the action of a spring (22) which can be acted on with different intensity by means of a magnet (78) which is displaceable between an idle position ($LL_{max}$) and an emergency idle position ($LL_{not}$).

When current flows through the setting member, the magnet is attracted and the corresponding spring is pretensioned so that the displaceable stop moves the setting lever, which is operatively connected with the driver, out of the emergency idle position into the maximum idle position. In this connection, the third stop which cooperates with the setting lever is also displaced into the maximum idle position and the emergency idle spring is compressed.

For this, it is advantageous that the setting lever (71) be contained within a free-wheel hook (47) which has two drivers arranged spaced apart from each other. In the device of the invention, it is of particular importance that an actual-value detection device be associated with the throttle valve and a desired-value detection device with the driver or the setting lever. If the driver accelerates with such a position of the throttle valve, then a new desired value is determined, and the electric control device compares the actual value on the drive with the desired value of the control element so that now the drive brings the throttle valve to the newly determined desired value.

BRIEF DESCRIPTION OF THE DRAWING

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENTS

Figure 1:
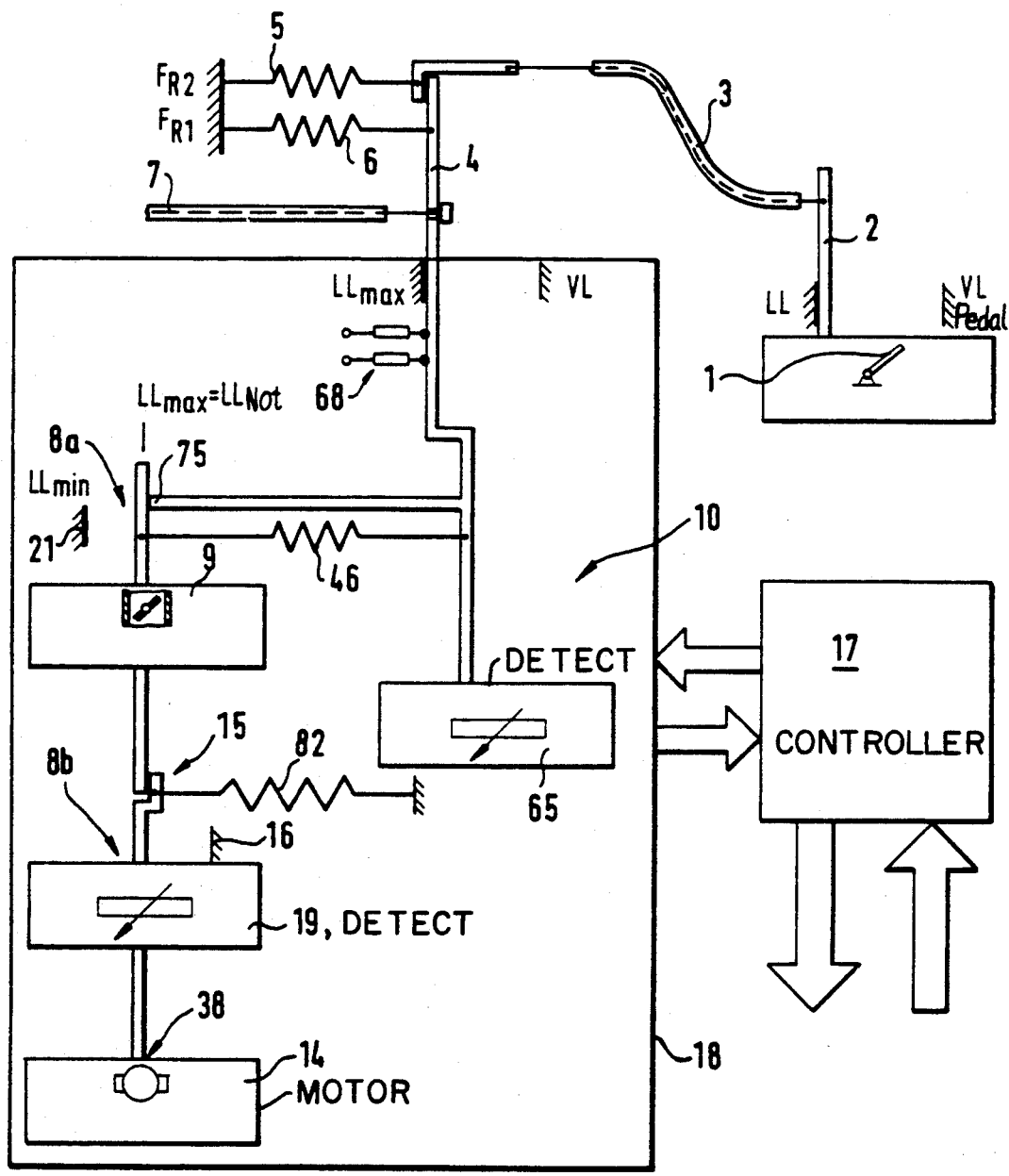
FIG. 1 is a block diagram showing the basic function of the load adjustment device of the invention.

The parts shown within the frame 18 in FIG. 1 form a setting member or a load adjustment device 10 which are combined into a structural unit. The load adjustment device 10 includes a setting motor or electric motor 14 which is connected for drive via a transmission (not shown, for the sake of simplicity, in the drawing) with a throttle-valve shaft for a throttle valve 9. Setting forces of the electric motor 14 are transmitted to the throttle valve 9, whereby displacement of the valve into the desired position is brought about.

As can be noted from FIG. 1, the load adjustment device 10 can be displaced via an accelerator pedal 1, in which connection, by actuation of the accelerator pedal 1 a lever 2 is displaced between an idle stop (LL) and a full-load stop (VL) and pretensioned via a return spring 5 in the idling direction (LL). The accelerator pedal 1 is connected by a gas cable 3 (Bowden cable) to a driver 4 so that, upon actuation of the accelerator pedal 1, the driver 4 is shifted in the direction of the full-load stop (VL). There is connected to the driver 4 a return spring 6 which urges the driver 4 in idle direction (LL). The driver 4 can pretension an automatic cable 7 of a transmission (not shown). As long as the gas cable 3 is not acted upon, the driver 4 lies against the idle stop ($LL_{max}$) associated with it (see FIG. 1).

The driver 4 cooperates via a spring, in particular a coupling spring 46, with a control element 8a which corresponds to the throttle-valve shaft which is not shown in the drawing. By means of the driver 4, assurance is had that the control element 8a is brought against a first stop 75 located on the driver 4, if the electric motor 14 is not activated via a control device 17, to displace the control element 8a in idling direction ($LL_{min}$).

Within the idle control range, the driver 4 lies against the idle stop ($LL_{max}$) and, as long as the driver does not actuate the accelerator pedal 1, it is held in this position by the return spring 6. The spring 46 also sees to it that the control element 8a is pulled against the stop 75 of the driver.

The load adjustment device of the invention has, in addition to the first control element 8a, a second control element 8b which is connected for drive with the electric motor 14. In order to connect the two control elements 8a, 8b mechanically to each other, the second control element 8b has a driver 15 which permits displacement of the first control element 8a only in the idling direction ($LL_{min}$), in other words the electric motor 14 can act only in power-reducing direction on the setting member.

To the control element 8b there is connected one end of a tension spring 82, the other end of which is connected to a fixed point on the housing of the load adjustment device 10. The tension spring 82 effects a displacement of the control element 8b in the direction towards the idle position ($LL_{max}$) when the setting member is not acted on by current or the electric motor 14 is disconnected.

As can be noted from FIG. 1, the setting path of the second control element 8b, and thus also the setting path of the first control element 8a, are limited by a stop 16 which extends, in the direction of the maximum idling position, into the setting path of the second control element 8b at the maximum position $LL_{max}$.

Limiting of the first control element 8a in the position of the minimum idle position ($LL_{min}$) is effected by a second stop 21 which extends into the setting path of the first control element 8a.

FIG. 1 diagrammatically shows the electronic control device 17, which contains processing, logic and control circuits. In its digital part, the control device 17 stores values for adaptation to the vehicle and processes the digital or digitalized values of different input variables which then control the desired position of the throttle valve 9 via an analog part. With the electronic control device 17 there cooperates the actual-value detection device 19 for the drive incorporating the control elements 8a, 8b, as well as a desired-value detection device 65 which is associated with the driver 4 and determines the instantaneous position of the driver 4.

A potentiometer, not shown in the drawing, forms a part of the first actual-value detection device 19 and a second potentiometer, also not shown in the drawing, forms a part of the desired-value detection device 65.

The object of the control device 17 is to detect all inputted signals, for instance speed, by means of the potentiometers and compare them with each other. If the speed of travel, for instance, differs from the desired-value set, then the setting member is controlled until the predetermined speed is reached.

Furthermore, the electronic control device 17 detects signals via an idle contact 68 (FIG. 2) which is activated by the driver 4 when the driver comes against the idle stop ($LL_{max}$) associated with it.

The electronic control device 17 serves, in cooperation with the actual-value detection device 19 and the external reference variables, to develop a safety logic with regard to the control of the first and second control elements 8a, 8b. As soon as the electronic control device 17 or the electric motor 14 no longer operates properly, the throttle valve 9 is moved into the emergency idle position ($LL_{max}$) which at the same time corresponds to an emergency idle position, by the return spring 6 which is pretensioned in the direction towards the maximum idle position.

By the load adjustment device of the invention, upward control ($LL_{max}$) and downward control ($LL_{min}$) can be effected over the entire idle range by means of a single setting member. Furthermore, it is possible to assure downward control of the internal combustion engine in the direction of the idle position ($LL_{max}$) outside the idle range by means of the electric motor 14 in the event of anti-slip control (ASR), since the electric motor 14 acts only in power-reducing manner on the setting member.

Figure 2:
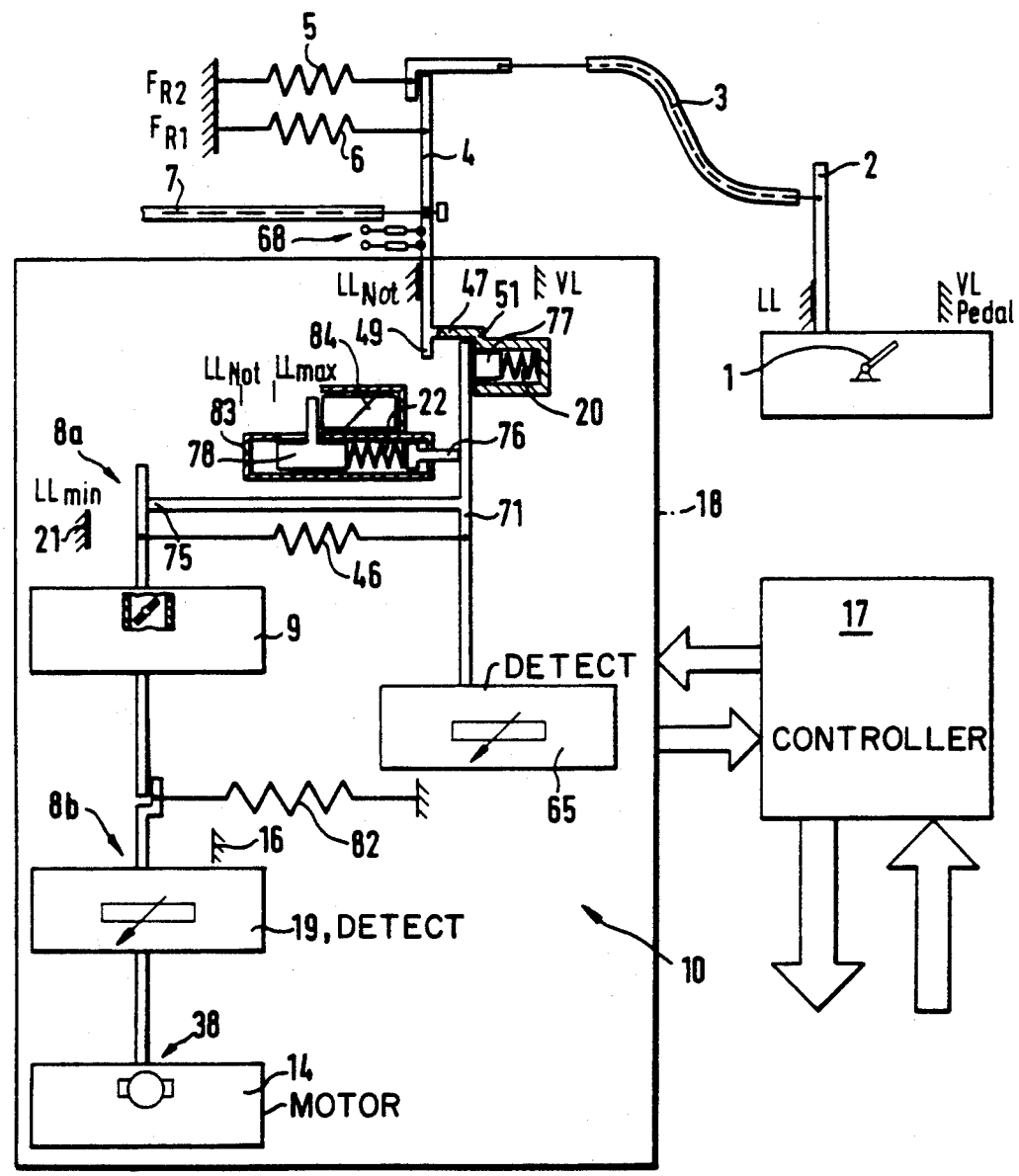
FIG. 2 shows diagrammatically a further embodiment of a load adjustment device having a displaceable stop in condition acted on by current.

FIG. 2 shows another embodiment of a load adjustment device 10 which, in addition to the driver 4, has a setting lever 71 on which is located the first displaceable stop 75. Another displaceable stop 76 is received in a cylinder 83 of a setting magnet 84. Between the setting magnet 84 and the displaceable stop 76 there is a compression spring 22 which can be pretensioned via the setting magnet 84 and presses the second stop 76 against the setting lever 71 and thus also against a third stop 77.

The setting lever 71 is arranged for displacement between two drivers 49, 51 which are spaced apart from each other and form a free-travel hook 47 which is firmly attached to the driver 4. In current-less condition or upon failure of the control device 17, the setting lever 71 is moved against the first driver 49 in the direction of minimum idling position by means of an emergency travel spring 20 and by means of the third stop 77 which cooperates with it, so that the control element 8a is displaced via the first displaceable stop 75 into the emergency idle position ($LL_{not}$).

When current flows in the setting member and the setting magnet 84 is thus attracted, the spring 22 is pretensioned more strongly and, via the second displaceable stop 76 and against the action of the somewhat weaker emergency spring 20, it displaces the first setting lever 71 in the direction of full-load operation (VL), the first setting lever 71 coming to rest within the free-travel hook 47, against the second driver 51. If the driver accelerates from this position, the setting lever 71 need not move through any dead path so that upon actuation of the accelerator pedal 1 the throttle valve 9 can be displaced immediately without delay.

Upon displacement of the accelerator pedal 1, the desired-value detection device 65, which is associated with the first setting lever 71, detects the instantaneous position of the setting lever 71 and compares this value with an actual-value detection device 19 associated with the throttle valve 9 so that now the electric motor 14 is controlled via the control device 17 to which the measurement data are fed, until the throttle valve 9 has reached the desired position.

If an anti-slip control case occurs, then downward control of the internal combustion engine is effected by means of the electric motor 14, the control device 17 detecting the corresponding disturbing variable, processing it, and thereby suitably controlling the electric motor 14 until the latter has brought the throttle valve 9 to the required value. From FIGS. 1 to 3 it is evident that the electric motor 14 can only act in reducing manner on the drive of the throttle valve 9. In this way, dependability in operation is increased, since assurance can be had that in case of an anti-slip control, no upward control of the internal combustion engine is possible since the control element 8b cannot turn the throttle-valve shaft in the open direction.

Figure 3:
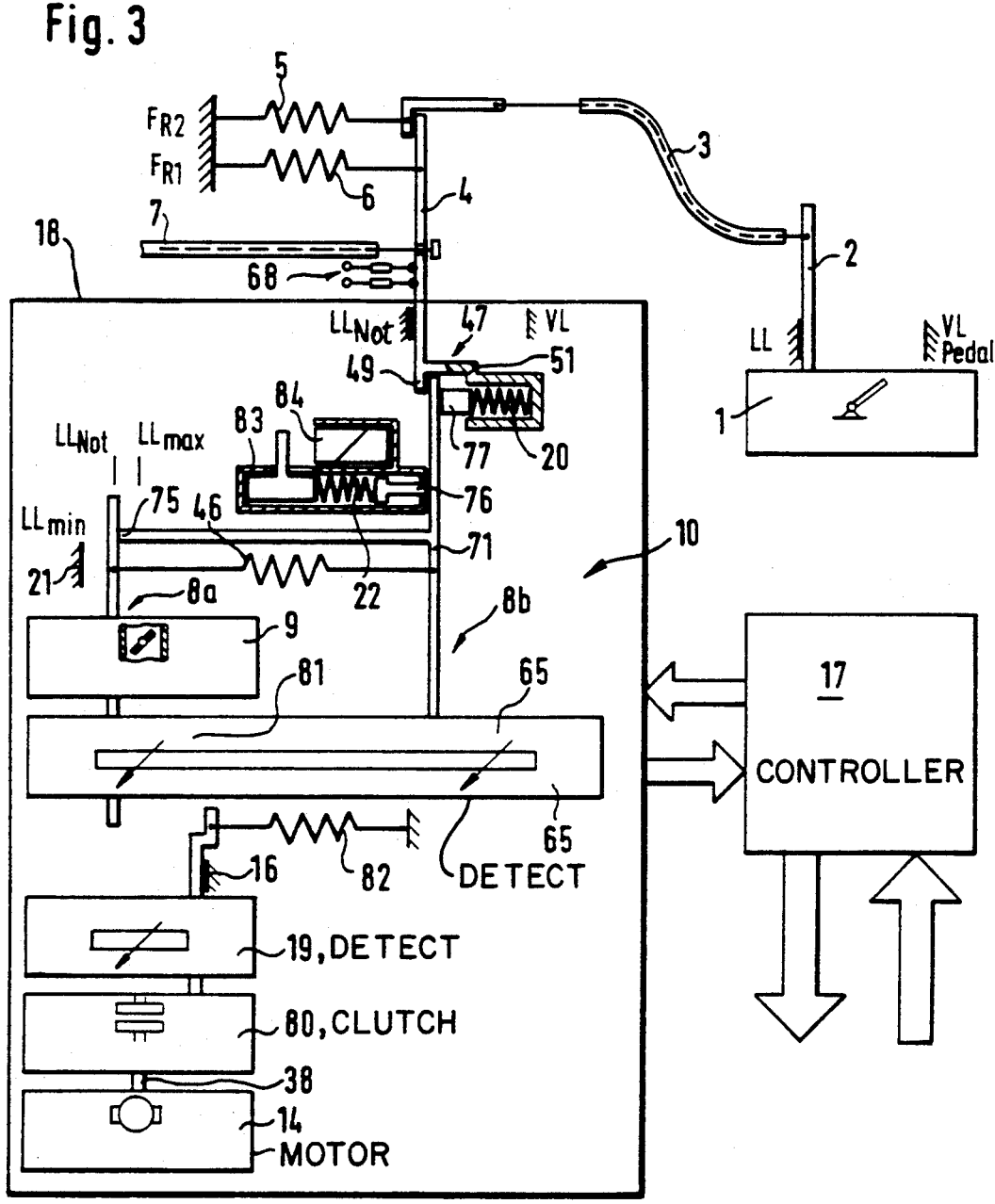
FIG. 3 shows diagrammatically a third embodiment of a load adjustment device having an adjustable stop shown in condition not traversed by current.

FIG. 3 shows a third embodiment, which differs only slightly from the embodiments shown in FIGS. 2 and 3. As can be noted from FIG. 3, in addition to the actual-value detection device 19 for the determination of the position of the drive, another actual-value detection device 81 is provided in order to detect the position of the throttle valve 9 so that both operating conditions can be detected by the control device 17 and compared with the desired value in order thereby to assure an even more precise control of the electric motor 14 and improve the control behavior of the setting member.

As can furthermore be noted from FIG. 3, the electric motor 14 can be coupled via a clutch 80 to the throttle-valve shaft, which is indicated in FIG. 3, by the control element 8b so that a drive connection is produced between a driven shaft 38 of the electric motor 14 and the throttle-valve shaft in the idling direction. In this way, the result is advantageously obtained that, upon disconnection of the electric motor 14 as a result of a disturbing variable, the electric motor 14 need not travel along under no-load, so that the individual springs need not be so strongly dimensioned since, with the electric motor 14 disconnected, they need only overcome the frictional resistances present in this system and the vacuum forces acting on the throttle valve 9. In this way, the setting member as a whole can be produced more economically.

We claim:
1. A load adjustment device comprising
  a throttle valve which determines the output power of an internal combustion engine;
  a throttle-valve housing and a throttle-valve shaft mounted in said housing, said throttle valve being connected, fixed for rotation, with said throttle-valve shaft;
  a control element, the throttle-valve shaft being acted on by said control element;

an accelerator pedal and a driver coupled to said accelerator pedal, said control element cooperating with said driver;

an electronic control device and an electric motor cooperating with said control device, said control element being controllable by means of said electric motor;

a first idle stop at maximum idle speed and a second idle stop which is displaceable between an emergency idle speed and maximum idle speed;

wherein a displacement path of said driver is limited by said first idle stop and, upon application of said driver against said first idle stop, said control element is moveable within an idle control range relative to said driver by means of said electric motor; and said driver is moveable toward minimum idle direction to contact said second stop.

2. A load adjustment device according to claim 1, wherein
said second stop is operatively connected to said driver.

3. A load adjustment device according to claim 1, further comprising a spring; and
wherein an adjustment path of said of said control element is limited in one direction by said second stop, and is displaceable in the opposite direction, toward minimum idle speed, against the action of said spring.

4. A load adjustment device according to claim 3, wherein
said spring connects said control element with said driver, and said control element is brought by said spring against said second stop.

5. A load adjustment device according to claim 1, further comprising
a second control element adapted to engage with said throttle-valve shaft in the idle direction.

6. A load adjustment device according to claim 3, wherein
said spring is developed as coupling element, and is connected at one end to said control element of said throttle valve, and at the other end to said driver.

7. A load adjustment device according to claim 1, further comprising
a third idle stop and a pressing means, said third stop being displaceable;
wherein said driver comprises a setting lever; and
said third stop rests at one end against said pressing means and, at the opposite end, against said setting lever.

8. A load adjustment device according to claim 7, further comprising
fourth stop and second pressure means, said fourth stop being displaceable; and
wherein viewed in the direction of increasing engine speed, said fourth stop is located opposite said third stop, said fourth stop being activated by said second pressure means to displace said setting lever in a direction of the emergency idling speed.

9. A load adjustment device according to claim 7, further comprising
a second spring and a magnet; and
wherein said third stop is displaceable against the action of said second spring, said second spring being acted on by said magnet, said magnet being displaceable between an idle position of maximum idle speed and an idle position of emergency idle speed.

10. A load adjustment device according to claim 7, wherein
said driver further comprises a free-wheel hook having two drivers arranged spaced apart from each other; and said setting lever extends into said free-wheel hook.

* * * * *